United States Patent [19]

Shiba et al.

[11] E Re. 29,379

[45] Reissued Aug. 30, 1977

[54] COLOR PHOTOGRAPHIC LIGHT-SENSITIVE MATERIAL

[75] Inventors: Keisuke Shiba; Nobuo Furutachi; Harumi Katsuyama; Takeshi Hirose; Toshiaki Aono; Shoji Ishiguro, all of Minami-ashigara, Japan

[73] Assignee: Fuji Photo Film Co., Ltd., Minami-ashigara, Japan

[21] Appl. No.: 678,815

[22] Filed: Apr. 21, 1976

Related U.S. Patent Documents

Reissue of:

[64] Patent No.: 3,933,500
Issued: Jan. 20, 1976
Appl. No.: 454,525
Filed: Mar. 25, 1974

[30] Foreign Application Priority Data

Mar. 23, 1973 Japan ..... 48-33238

[51] Int. Cl.[2] ..... G03C 1/76; G03C 7/00; G03C 1/40

[52] U.S. Cl. ..... 96/74; 96/56.5; 96/100 N

[58] Field of Search ..... 96/74, 100 N, 56.5

[56] References Cited

U.S. PATENT DOCUMENTS

| | | | |
|---|---|---|---|
| 3,617,291 | 11/1971 | Sawdey | 96/100 |
| 3,770,436 | 11/1973 | Fujiwhara et al. | 96/100 |

*Primary Examiner*—David Klein
*Assistant Examiner*—L. Falasco
*Attorney, Agent, or Firm*—Sughrue, Rothwell, Mion, Zinn and Macpeak

[57] ABSTRACT

A color photographic silver halide light-sensitive material which comprises a support having thereon at least two light-sensitive layers, at least one of said layers containing a compound capable of coupling with an oxidation product of a color developing agent and in which splitable hetero aromatic ring containing a triazole or diazole ring is connected to the carbon atom in the coupling position, through the nitrogen atom in the 1-position of said triazole or diazole ring.

13 Claims, 4 Drawing Figures

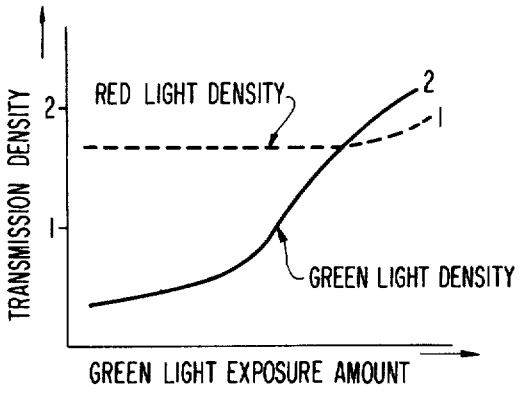
FIG. 1
SAMPLE A
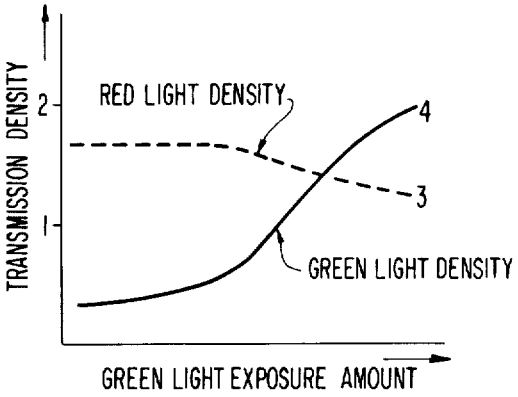
FIG. 2
SAMPLE B
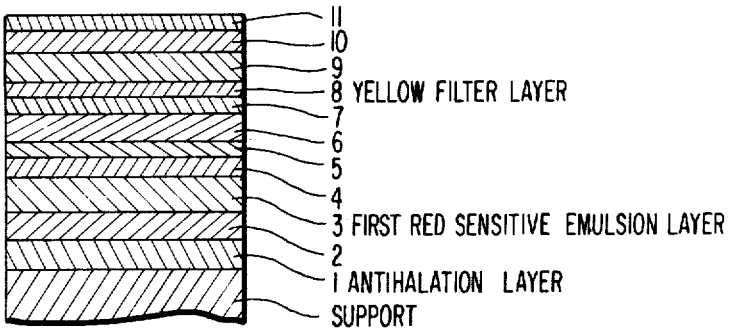
FIG. 3
FIG. 4
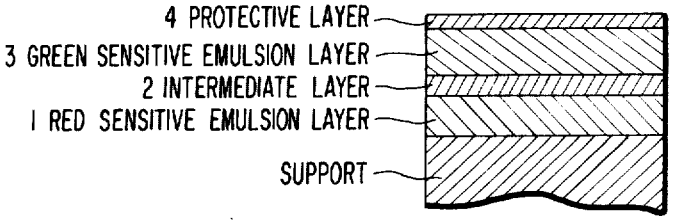

COLOR PHOTOGRAPHIC LIGHT-SENSITIVE MATERIAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a color photographic light-sensitive material having improved color reproducibility and, more particularly, it is concerned with a color photographic light-sensitive material whose color image quality is improved by applying a compound which selectively shows a color correcting effect between layers.

2. Description of the Prior Art

Color photographic light-sensitive materials can be roughly classified into two groups: (1) color photographic light-sensitive materials which do not contain couplers (non-incorporated coupler system) wherein a developer containing a diffusible coupler is used; and (2) color photographic light-sensitive materials which contain couplers (incorporated coupler system) wherein non-diffusible couplers are incorporated independently in each of the light-sensitive layers of a light-sensitive material so as to maintain the independent function of each layer.

The latter system usually comprises a blue-sensitive emulsion layer (BL) which contains a yellow coupler and which is mainly sensitive to blue light (substantially to wavelengths less than about 500 nm), a green-sensitive emulsion layer (GL) which contains a magenta coupler and which is mainly sensitive to green light (substantially to wavelengths of about 500 - 600 nm), and a red-sensitive emulsion layer (RL) which contains a cyan coupler and which is mainly sensitive to red light (substantially to wavelengths longer than about 590 nm). These BL, GL and RL must perform their own independent functions. For this reason, the latter system further contains a so-called intermediate layer (ML), a filter layer (FL) for filtering out light including ultraviolet light, an anti-halation layer (AHL) and a protective layer (PL), thus forming a multi-layered stratal structure of two or more layers.

With the multi-layered incorporated-coupler color photographic light-sensitive materials, it is necessary that at least the BL, GL and RL should independently perform their functions in a fresh condition, upon storage of the unexposed material or upon imagewise exposure and in the step of development-processing, so as to obtain excellent color reproducibility. In addition, it is necessary that the BL, GL and RL should independently possess appropriate spectral sensitization distributions in appropriate wavelength regions and contain couplers capable of providing color images having appropriate spectral absorptions. However, color photographic ligth-sensitive materials which have so far been developed possess numerous defects.

A first defect thereof in connection with color reproduction lies in the spectral adsorption characteristics of the colored images obtained from the couplers used. That is, sufficient light adsorption is not attained in a specific wavelength region and, in addition, the light absorption extends too widely to other wave-length regions, e.g., undesirably into shorter or longer wavelength regions. Of the yellow couplers, magenta couplers and cyan couplers, this defect is particularly conspicuous with magenta couplers. This defect results in a narrow color reproduction region of the color image, distortion of the color hue and, particularly, a reduction in saturation.

A second defect lies in that, during the step of development processing, the image development of a specific light-sensitive emulsion layer can cause coloration of the coupler contained in a neighboring light-sensitive emulsion layer. For example, in some cases, image development of the GL can induce coloration of a cyan coupler contained in the RL. These defects result from the diffusion of the oxidation products of the color developing agent, which are produced by the development of a specific light-sensitive layer, into a neighboring light-sensitive layer, color formation at the layer into which the oxidation products have diffused, and from the induction of chemical or physical development in the neighboring layer upon development of a specific light-sensitive layer.

A third defect lies in that a sensitizing dye used diffuses from a specific light-sensitive emulsion layer into an adjacent light-sensitive emulsion layer to sensitize the adjacent layer and provide an unsuitable spectral sensitization distribution.

The above-described defects will cause the so-called "color mixing" because the color image-forming reaction in a specific light-sensitive emulsion layer disadvantageously affects the neighboring light-sensitive emulsion layers which should be independent of the other layers and induces color image formation, which image overlaps the color image of the specific light-sensitive emulsion layer.

One known method to remove the above-described defects is a method of reducing "color mixing" itself by, e.g., providing an ML and an FL or incorporating in an ML a reducing compound such as a hydroquinone derivative or a phenol derivative, a scavenger for the oxidation product of a color developing agent, a colorless compound capable of coupling with it, a color coupler capable of forming a diffusible dye, a diffusion-inhibiting agent for a sensitizing dye or a coupler, such as fine silver halide grains colloidal silica, an anionic, amphoteric, nonionic or cationic surface active agent, a cationic hydrophilic synthetic polymer, polymer latex and the like. However, these methods are not satisfactory.

Another method for removing "color mixing" lies in the introduction of an element which is positively provided with a "color correcting" function. One such method involves using a colored coupler provided with an auto-masking function. Related methods are described in U.S. Pat. Nos. 2,449,966; 2,455,170; 2,600,788; 2,428,054; 3,148,062; and 2,983,608 and British Pat. No. 1,044,778. However, with this method, the unexposed area is also strongly colored. Therefore, this method cannot be applied to positive color light-sensitive materials. This is attributed to the fact that, in the color development-processing step employed, the product formed as a result of the elimination of the eliminatable azoaryl group tends to cause fog, which deteriorates the graininess or granularity of the color image formed.

Another method involves using a so-called "DIR coupler." DIR couplers are those couplers described by C. R. Barr, J. R. Thirtle and P. W. Vittum, Photographic Science and Eng., vol. 13, pp. 74–80 (1969) and ibid, pp. 214–217 (1969), or in U.S. Pat. No. 3,227,554. Usually, the use of a DIR coupler conspicuously brings about an intralayer (or intraimage) effect within a light-sensitive emulsion layer in which such is used by restraining the development therein, such as an improvement in graininess and an improvement in sharpness of color image by the edge effect in preference to the interimage (or interlayer) effect. It is generally known that a DIR coupler brings about an intraimage effect. However, since the DIR coupler which is disclosed in U.S. Pat. No. 3,227,554 causes a strong development-restraining effect upon color development at developing centers in proportion to imagewise exposure-image development, the use of a DIR coupler has the defect that gradation (gamma) is deteriorated or maximum color density ($D_{max}$) is reduced. Therefore, in order to more effectively perform the function of "color correction" relating to the present invention, those couplers become necessary which exhibit an interimage effect rather than the effect of restraining development within a particular layer. In connection with a DIR coupler, the chemical structure of the compound which effectively exhibits the interimage effect rather than the intraimage effect cannot be determined by merely considering the chemical structures of the mother nucleus of known couplers or the chemical structures of the splitable groups thereof. Because, the effect of "color correction" due to a DIR coupler is obtained as a result of complicated factors, e.g., the independent or composite factors arising in the elimination-coupling reaction rate of DIR coupler, the development-restraining activity of the split group, the diffusibility thereof in a light-sensitive layer, the developing rate of each copresent light-sensitive emulsion itself, the coupling activity of the couplers copresent in the same layer or present in other layers, the mutual interaction with the compounds copresent in an ML or an FL, the spectral absorption characteristics of colored dye, and the like.

Thirdly, there is a method of using a substantially fogged emulsion or a direct positive emulsion, a method of using an internally fogged emulsion or an internal latent image emulsion, a method of employing the Luckey effect, or a like method. However, these methods of using silver halide photographic emulsions entail a reduction in sharpness due to exposure light-scattering effect of the grains therein, the difficulty in controlling the photographic properties of the emulsion, the photographic side effects, and the like.

Fourthly, there is a method of controlling the halide composition of silver halide emulsion itself which is used in each layer of the BL, GL and RL of the multilayered structure, e.g., controlling the ratio of the content of iodide ion to bromide ion, controlling the distribution of a restraining element between the layers, and the like. However, the effect of "color correction" by controlling these factors is not satisfactory.

In addition, such factors as the developing agent content, the halide ion content the sulfite ion content, the hydrogen ion content and its buffering ability, the exhaustion degree thereof, and the like. However, the effect of "color correction" by controlling these factors is not satisfactory, either.

As the aforesaid DIR coupler, a 2-equivalent coupler having a 2-benzotriazolyl group is already known, for example, as described in U.S. Pat. No. 3,617,291. As set forth in this patent, this coupler has an excellent 2-equivalent property and has an excellent property of emitting fluorescence. Furthermore, this coupler provides an excellent fast colored image and possesses a development-restraining property. However, this strong fluorescence-emitting property is disadvantageous for the purposes of the present invention. For example, when used for a positive light-sensitive material, this coupler reduces the optical density of a color image formed in an adjacent layer, which is different from this coupler-containing layer and which has substantially a different hue, and the coupler shifts the hue, resulting in a deterioration of the deep shadow gradation of the image. On the other hand, when used in a negative light-sensitive material, this coupler fluoresces due to exposure to light upon printing, thus reducing the sharpness of the printed image. The effects described in the specification of the aforesaid patent appear only in the colorless white area of a positive light-sensitive material using, particularly, a reflective support or only when the coupler is used in a layer closest to the support. In addition, this coupler strongly exhibits an intralayer effect and, as compared with this, this coupler exhibits a small interlayer effect. In addition this patent specification does no describe the effect of "color correction" with which the present invention is concerned.

An object of the present invention is to remove the abovedescribed defects and to provide a color light-sensitive material having an enhanced effect of "color correction."

More particularly, a primary object of the present invention is to improve the color reproducibility by using the coupler of the present invention which reduces gradation (gamma) or maximum color density ($D_{max}$) to a lesser extent and provides interlayer effect or interimage effect.

Another object of the present invention is to provide a novel 2-equivalent coupler.

A further object of the present invention is to provide a novel coupler which can be inexpensively produced on an industrial scale with a stable quality using a process different from that employed for synthesizing conventional DIR coupler.

Still a further object of the present invention is to provide a non-fluorescing coupler in contrast to that described in U.S. Pat. No. 3,617,291.

These and other [object] *objects* will become apparent from the detailed descriptions in the specification of the present invention.

SUMMARY OF THE INVENTION

The above-described objects of the present invention are attained as follows. That is, the invention comprises incorporating a compound capable of coupling with an oxidation product of a color developing agent in a color photographic light-sensitive material comprising a support and at least two silver halide light-sensitive emulsion layers which layers provide color images, upon color development, substantially different from each other in hue (the compound being a compound containing splitable hetero aromatic ring containing a triazole or diazole ring bonded to the carbon atom in the coupling position through the nitrogen atom in the 1-position of the triazole or diazole ring), alone or in combination with other coupler or couplers.

BRIEF DESCRIPTION OF THE ACCOMPANYING DRAWINGS

FIGS. 1 and 2 show the characteristic curves obtained in the Examples.

FIGS. 3 and 4 schematically illustrate the multi-layered structure of the light-sensitive materials used in the Examples.

DETAILED DESCRIPTION OF THE INVENTION

The above-described compounds used in the present invention are substantially colorless couplers which provide an interlayer effect, perform the function of "color correction," and have a hetero ring containing a triazole ring or diazole ring connected to the coupling nucleus moiety of the coupler through the nitrogen atom located at 1-position. The coupling nucleus moiety of the couplers of the present invention can also be selected from among, e.g., 4-equivalent couplers used in color light-sensitive materials. For example, there are illustrated 5-pyrazolone couplers, cyanoacetylcoumarone couplers, indazolone couplers, acylacetanilide couplers, pivaloylacetanilide couplers, aroylacetanilide couplers, naphthol couplers, phenol couplers, etc., for example.

Examples of magenta couplers are magenta couplers such as the 5-pyrazolones, the cyanoacetylcoumarones [adn] *and* the indazoles as disclosed in U.S. Pat. Nos. 2,600,788; 2,801,171; 2,908,573; 2,983,608; 3,046,129; 3,062,653, 3,227,554.

Of the magenta couplers, those represented by the following general formula (I) are particularly useful;

(I)

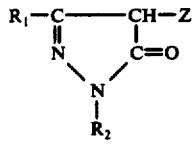

wherein $R_1$ represents an alkyl group (e.g., having 1 to 18 carbon atoms) such as a primary, secondary or tertiary alkyl group (e.g., methyl, propyl, n-butyl, t-butyl, hexyl, 2-hydroxyethyl, 2-phenylethyl, etc.), an aryl group (e.g., phenyl, tolyl, m-acylaminophenyl etc., an alkoxy group (e.g., methoxy, ethoxy, benxyloxy, etc.), an aryloxy group (e.g., phenoxy, 3,3'-dialkoxycarbonylphenyoxy, etc.) a hetero ring (e.g., quinolinyl, pyridyl, piperidyl, benzofuranyl, oxazolyl, etc.), an amino group (e.g., methylamino, diethylamino, dibutylamino, phenylamino, tolylamino, 4-(3-sulfobenzamino)anilino, 2-chloro-5-acylaminoanilino, 2-chloro-5-alkoxycarbonylanilino, 2-trifluoromethylphenylamino, etc.), a carbonamido group (e.g., alkylcarbonamido, arylcarbonamido, heterocycliccarbonamido, sulfonamido, alkylsulfonamido, arylsulfonamido, heterocyclic sulfonamido, etc.), an ureido group (e.g., alkylureido, arylureido, heterocyclic ureido, etc.), and $R_2$ represents an aryl group (e.g., naphthyl, phenyl, 2,4,6-trichlorophenyl, 2-chloro-4,6-dimethylphenyl, 2,6-dichloro-4-methoxyphenyl, 4-methylphenyl, 4-acylaminophenyl, 4-alkylaminophenyl, 4-trifluoromethylphenyl, 3,5-dibromophenyl, etc.), a heterocyclic group (e.g., benzofuranyl, naphthoxazolyl, quinolinyl, etc.), an alkyl group such as a primary, secondary or tertiary alkyl group (e.g., methyl, ethyl, t-butyl, benzyl, etc.), and the like.

In addition, yellow couplers such as the open-chained acylacetonitrile yellow couplers, the acylacetyl yellow couplers and the open-chained acylacetanilide yellow couplers (e.g., pivalylacetanilide couplers, aroylacetanilide couplers, acylacetanilide couplers, etc.) are included, for example as described in U.S. Pat. Nos. 2,875,057; 2,908,573; 3,046,129; 3,227,155; 3,265,506; 3,384,657; 2,728,658; 3,253,924; 3,227,550; 3,227,554.

Of the yellow couplers, those represented by the following general formula (II) are particularly useful;

(II)

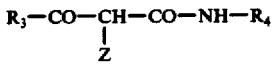

wherein $R_3$ represents a primary, secondary or tertiary alkyl group having 1 to 18 carbon atoms (e.g. t-butyl, 1,1-dimethylpropyl, 1,1-dimethyl-1-methoxyphenoxymethyl, 1,1-dimethyl-1-ethylthiomethyl, etc.) or an aryl group (e.g., phenyl, 3-methylphenyl, 3-octadecylphenyl, alkoxyphenyl, 2-methoxyphenyl, 4-methoxyphenyl, halophenyl, 2-halo-5-alkamidophenyl, 2-chloro-5-[α-(2,4-di-t-amylphenoxy)butylamido]phenyl, 2-methoxy-5-alkamidophenyl, 2-chloro-5-sulfonamidophenyl, etc.), $R_4$ represents a phenyl group (e.g., 2-chlorophenyl, 2-halo-5-alkamidophenyl, 2-chloro-5-[α-(2,4-di-t-amylphenoxy)acetamido]phenyl, 2-chloro-5-(4-methylphenylsulfonamido)phenyl, 2-methoxy-5-(2,4,-di-t-amylphenoxy)acetamidophenyl, etc.

In addition, the 2-acylaminophenyl type cyan couplers, the 2-aminoacylnaphthol type cyan couplers, and the like are included, for example, as disclosed in U.S. Pat. Nos. 2,423,730; 2,474,293; 2,521,908. Of them, those represented by the following general formula (III) are particularly useful;

(III)

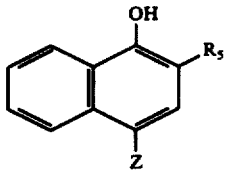

wherein $R_5$ represents an substituent usually employed in cyan couplers, such as a carbamyl group (e.g., alkylcarbamyl, arylcarbamyl, heterocyclic carbamyl group such as benzothiazolylcarbamyl, etc.), a sulfamyl group (e.g., alkylsulfamyl, arylsulfamyl, phenylsulfamyl, arylsulfamyl, heterocyclic sulfamyl, etc.) an alkoxycarbonyl group, or the like.

The coupling nucleus moiety of the couplers or coupling compounds which can be used in the present invention is not limited only to those represented in the above-described general formula (I), (II) or (III). For example, the coupling nucleus moieties as described in U.S. Pat. Nos. 3,632,345 and 3,622,328, German Pat. OLS Nos. 2,019,430 and 2,032,711, etc. can also be used.

The splitable group used in the present invention is located at the coupling position represented, e.g., by Z in the general formula (I), (II) or (III).

Z represents a substituent selected from those hetero ring residues forming at least a 1-triazole ring or 1-diazole ring, which is split-off upon color development.

More specifically, Z represents a triazole or diazole hetero ring residue represented by the following general formula:

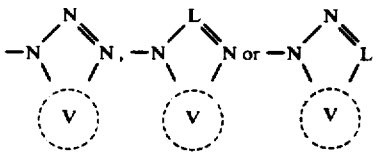

wherein V represents an aromatic ring of the benzene series or a heteroaromatic ring containing at least one nitrogen atom, L represents a methine group or a derivative thereof, and V can be substituted with an amino group, an acylamino group, a halogen atom, an alkyl group, a nitro group, an alkoxy group, an alkylthio group, an arylthio group, an aryl group or the like. Z can have another coupling nucleus (i.e., the general formulae (I), (II) or (III) described hereinbefore but without the Z substituent) by forming a bis derivative or through a divalent bond or group. In addition, Z can contain a ballasting group containing 8 to 32 carbon atoms. A preferred embodiment of the above triazole hetero ring has the general formula

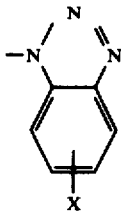

wherein X represents a hydrogen atom, a halogen atom, an alkyl group or the atoms necessary to form a naphthalene ring together with the benzene ring containing the X substituent. As specific examples of ZH where Z is connected to a hydrogen atom, there are illustrated, e.g., the compounds described in U.S. Pat. Nos. 3,185,570, 3,244,521, 3,499,761, 3,473,924, 3,575,699, 3,554,757, British Pat. Nos. 919,061, 1,031,262, French Pat. Nos. 1,346,227, 1,594,983, German Pat. No. 1,294,188, etc.

Specific examples of couplers which can be used in the present invention and synthesis examples for obtaining same are shown below which, however, are not intended to be interpreted as limiting the present invention in any way.

COUPLER 1

1-[4- α-(2,4-Di-t-amylphenoxy)acetamido phenyl]-3-methyl-4-(5- or 6-bromo-1-benzotriazolyl)-5-pyrazolone.

COUPLER 2

1-[4- α-(2,4-Di-t-amylphenoxy)butyramido-phenyl]-3-methyl-4-(5- or 6-bromo-1-benzotriazolyl)-5-pyrazolone

COUPLER 3

1-[4-(n-Tetradecanamido)phenyl]-3-methyl-4-(5- or 6-bromo-1-benzotriazolyl)-5-pyrazolone

COUPLER 4

1-[4- α-(2,4-Di-t-amylphenoxy)butyramidophenyl]-3-phenyl-4-(1-benzotriazolyl)-5-pyrazolone

COUPLER 5

1-(2,4,6-Trichlorophenyl)-3- 2-chloro-5-(tetradecanamido)-anilino -4-(5- or 6-acetamido-1-benzotriazolyl)-5-pyrazolone

COUPLER 6

1-[4- (3-n-Pentadecylphenoxy)acetamido phenyl]-3-hydroxy-4-(1-benzimidazoyl)-5-pyrazolone

COUPLER 7

1-[4- α-(2,4-Di-t-amylphenoxy)butyramidophenyl]-3-pyrrolidino-4-(1-indazoyl)-5-pyrazolone

COUPLER 8

1-[4- (3-n-Pentadecylphenoxy)acetamido phenyl]-3-pyrrolidino-4-(1-benzotriazolyl)-5-pyrazolone

COUPLER 9

1-[4- α-(2,4-Di-t-amylphenoxy)butyramidophenyl]-3-methyl-4-(5- or 6-nitro-1-benzotriazolyl)-5-pyrazolone

COUPLER 10

1-[4- α-(2,4-Di-t-amylphenoxy)butyramidophenyl]-3-(4-methoxyanilino)-4-(5- or 6-nitrobenzotriazolyl)-5-pyrazolone

COUPLER 11

α-Pivaloyl-α-(5- or 6-bromo-1-benzotriazolyl)-5- α-(2,4-di-t-amylphenoxy)butyramido-2-chloroacetanilide

COUPLER 12

α-(4-Methoxybenzyl)-α-(5- or 6-nitro-1-benzotriazolyl)-5- γ-(2,4-di-t-amylphenoxy)butyramido -2-chloroacetanilide

COUPLER 13

1-[4- α-(2,4-Di-t-amylphenoxy)butyramidophenyl]-3-methyl-4-(7-purinyl)-5-pyrazolone

COUPLER 14

N- α-(2,4-Di-t-amylphenoxy)butyryl-ω-(5- or 6-nitro-1-benzotriazolyl)-p-aminoacetophenone

COUPLER 15

N-α-(2,4-Di-t-amylphenoxy)acetyl-ω-(5- or 6-bromo-1-bensotriazolyl)-m-aminoacetophenone

COUPLER 16

4-n-Stearyloxy-ω-(5- or 6-chloro-1-benzotriazolyl)-acetophenone

COUPLER 17

4-n-Dodecyl-ω-(5- or 6-bromo-1-benzotriazolyl)-acetophenone

COUPLER 18

N- α-(2,4-Di-t-amylphenoxy)acetyl -ω-(5- or 6-bromo-1-benzimidazoyl)-m-aminoacetophenone

COUPLER 19

4-n-Stearyloxy-ω-(5- or 6-nitro-1-indazolyl)-acetophenone

COUPLER 20

1-Benzyl-3- 2-chloro-5-(tetradecanamido)anilino-4-(5- or 6-methyl-1-benzotriazolyl)-5-pyrazolone

COUPLER 21

1-[4- α-(2,4-Di-t-amylphenoxy)acetamido phenyl]-3-ethoxy-4-(5- or 6-bromo-1-benzotriazolyl)-5-pyrazolone

COUPLER 22

1-Benzyl-3- 2-chloro-5-(tetradecanamido)anilino -4-(5- or 6-bromo-1-benzotriazolyl)-5-pyrazolone

COUPLER 23

1-(4-Acetoamidophenyl)-3- 2-methoxy-5-(tetradecyloxycarbonyl)anilino -4-(5- or 6-bromo-1-benzotriazolyl)-5-pyrazolone

COUPLER 24

α-(4-Octadecyloxybenzoyl)-α-(5- or 6-bromo-1-benzotriazolyl)-2-methoxyacetanilide

COUPLER 25

α-Pyvaloyl-α-(1-benzotriazolyl)-5- α-(2,4-di-t-amylphenoxy)-butyramido -2-chloroacetanilide

COUPLER 26

α-(5- or 6-bromo-1-benzotriazolyl)-α-methoxy-5-hexadecyloxycarbonylacetanilide

SYNTHESIS EXAMPLE 1

Synthesis of 1-[4- α-(2,4-Di-tert-amylphenoxy)acetamidophenyl]-3-methyl-4-(5- or 6-bromo-1-benzotriazolyl)-5-pyrazolone (COUPLER 1)

a. Synthesis of 1-(4-Nitrophenyl)-3-methyl-4-(5- or 6-bromo-1-benzotriazolyl)-5-pyrazolone (Intermediate A);

11 grams of ethyl α-acetyl-α-(5- or 6-bromo-1-benzotriazolyl) acetate, synthesized from ethyl (α-acetyl-α-chloroacetate) and 5- or 6-bromobenzotriazole in a conventional manner, and 10 g of 4-nitrophenylhydrazine were heated and refluxed for 3 hours in 100 ml of ethanol. Thus, yellow crystals were precipitated. After cooling, these crude crystals were filtered out and suspended in 200 ml of methanol. Then, 3 g of sodium methylate was added thereto, the mixture being refluxed for 1 hour. The floating materials in methanol were filtered off while the mixture was still warm. After cooling the filtrate, an excess amount of hydrogen chloride saturated ethanol (100 ml) was added dropwise thereto. Thus, 17 g of Intermediate A as the hydrochloride was obtained.

b. Synthesis of 1-(4-Aminophenyl)-3-methyl-4-(5-or 6-bromo-1-benzotriazolyl)-5-pyrazolone (Intermediate B);

1 grams of Intermediate A was added to a mixture of 80 ml is isopropanol and 16 ml of water. Then, 220 mg of ammonium chloride and 6.7 g of reduced iron were added thereto, the resulting mixture being heated at reflux for 1 hour. After cooling, the reaction solution was poured into 100 ml of water and, after making the reaction solution alkaline using excess potassium carbonate, subjected to filtration on Celite-545 (produced by Johns-Manville Products Corp.). The resulting filtrate was neutralized with acetic acid, and the precipitate formed was collected by filtration and well dried. Thus, Intermediate B was obtained in 9 percent yield.

c. Synthesis of Coupler 1;

5 grams of Intermediate B was suspended in 100 ml of acetonitrile, and 4 g of α-(2,4-di-tert-amylphenoxy)acetyl chloride was added thereto and heated at reflux for 3 hours. Then, the reaction solution was added to an excess amount of ethyl acetate (about 150 ml). After washing well successively, with water and an aqueous saturated sodium chloride solution, the solution was dried over anhydrous sodium sulfate. Ethyl acetate was then removed under reduced pressure, and the gum-like residue was crystallized from hexane-ethyl acetate (10:1 by volume). Thus, 7 g of Coupler 1 having a melting point of 142° - 144° C was obtained.

ELEMENTAL ANALYSIS

| | | | |
|---|---|---|---|
| Calcd. for $C_{34}H_{39}N_6O_3Br$: | C(62.0%), | H(5.92%), | N(12.8%) |
| Found: | C(61.73%), | H(5.91%), | N(12.70%) |

MASS SPECTROGRAPHIC ANALYSIS

No M+ peak; m/e: 630; (M+-$N_2$) appeared.

From the above-described data, the structure of Coupler 1 was confirmed to be the aforesaid 1-benzotriazolyl-substituted derivative.

SYNTHESIS EXAMPLE 2

Synthesis of 1-[4- α-(2,4-Di-tert-amylphenoxy)-butyramido-phenyl]-3-methyl-4-(5- or 6-bromo-1-benzotriazolyl)-5-pyrazolone (COUPLER 2)

8 grams of Intermediate B described in Synthesis Example 1 was heated under reflux in 200 ml of acetonitrile, together with 6.2 g of α-(2,4-di-tert-amylphenoxy)butyryl chloride, and treated in the same manner as described in Synthesis Example 1 to obtain 11 g of Coupler 2 having a melting point of 141° - 143° C.

ELEMENTAL ANALYSIS

| | | | |
|---|---|---|---|
| Calcd. for $C_{36}H_{43}N_6O_3Br$: | C(63.1%), | H(6.26%), | N(12.2%) |
| Found: | C(62.9%), | H(6.25%), | N(12.3%) |

MASS SPECTROGRAPHIC ANALYSIS

No M+ peak; m/e: 658; (M+-28)

SYNTHESIS EXAMPLE 3

Synthesis of 1- 4-(n-Tetradecanamido)phenyl -3-methyl-4-(5- or 6-bromo-1-benzotriazolyl)-5-pyrazolone (Coupler 3):

11.4 grams of Intermediate B described in Synthesis Example 1 was heated under reflux in 200 ml of acetonitrile together with 7.4 g of n-tetradecanyl chloride. As the reaction progressed, crystals were precipitated in the reaction solution. After confirming by a thin layer chromatogram that the starting material was completely consumed, the reaction solution was cooled and subjected to filtration. The crystals obtained were recrystallized from ethyl acetate-acetonitrile (10:1 by volume) to obtain 13.5 g of coupler 3 having a melting point of 188° - 191° C.

ELEMENTAL ANALYSIS

| | | | |
|---|---|---|---|
| Calcd. for $C_{30}H_{39}N_6O_2Br$: | C(60.5%), | H(6.55%), | N(14.1%) |
| Found: | C(60.53%), | H(6.44%), | N(14.31%) |

MASS SPECTROGRAPHIC ANALYSIS

No $M^+$ peak appeared m/e: 556; ($M^+$-28)

SYNTHESIS EXAMPLE 4

Synthesis of N- α-(2,4-Di-tert-amylphenoxy)acetyl -ω-(5-or 6-bromo-1-benzotriazolyl)-m-aminoacetophenone (Coupler 15):

Synthesis of N- α-(2,4-Di-tert-amylphenoxy)acetyl-ω-bromo-m-aminoacetophenone;

40 grams (0.1 mol) of N- α-(2,4-di-tert-amylphenoxy)acetyl -m-aminoacetophenone (m.p.:135° C), obtained by the reaction between m-aminoacetophenone and α-(2,4-di-tert-amylphenoxy)acetyl chloride in pyridine, was dissolved in 200 ml of anhydrous ethyl ether (placed in a three-necked flask), and 0.5 g of anhydrous aluminum chloride powder was added to this solution followed by ice-cooling (about 0°-5° C) under stirring. 16 grams (0.1 mol) of bromine was added dropwise to this mixture. After the completion of the dropwise addition, the temperature was allowed to rise to room temperature (about 20°-35° C). Stirring was continued until the generation of hydrogen bromide stopped. Thus, white crystals were precipitated.

The reaction mixture was extracted with ethyl acetate, the extract being washed with water then dried. A white solid product was obtained on concentration. Upon recrystallizing the resulting compound from ligroin, 33 g (68 percent) of the above-identified compound having a melting point of 83° - 84° C was obtained.

Synthesis of N- α-(2,4-Di-tert-amylphenoxy)acetyl -ω-(5- or 6-bromo-1-benzotriazolyl)-m-aminoacetophenone;

24 grams (0.05 mol) of the above-described N- α-(2,4-di-tert-amylphenoxy)acetyl -ω-bromo-m-aminoacetophenone and 15 g (0.05 mol) of 5-bromobenzotriazole were suspended in 200 ml of acetonitrile. 10 ml of triethylamine was added to this suspension, stirring being continued at room temperature.

The progress of the reaction followed through thin layer chromatography. The reaction was completed in about 5 hours. This reaction solution was extracted with ethyl acetate and the resulting extract was washed successively, with 1N hydrochloric acid aqueous solution and water, followed by drying. Upon concentration, a white solid product was obtained.

Upon recrystallizing this compound from acetonitrile, 21 g (70 percent) of the above-identified compound having a melting point of 172° - 174° C was obtained.

ELEMENTAL ANALYSIS

| | | | |
|---|---|---|---|
| Calcd. for $C_{32}H_{37}N_4O_3Br$: | C(63.47%), | H(6.16%), | N(9.25%) |
| Found: | C(63.42%), | H(6.06%), | N(9.25%) |

The couplers of the present invention are roughly classified into two groups: one being Fischer type couplers having a watersoluble group, a hydroxy group, a sulfo group, etc; and the other being hydrophobic couplers.

As a method for the addition of the couplers to an emulsion or to a gelatino-silver halide emulsion or hydrophilic colloid or as a method for the dispersion thereof in an emulsion, those conventionally known in the art can be applied. For example, a method in which the coupler is mixed with a high boiling organic solvent such as dibutyl phthalate, tricresyl phosphate, wax, higher fatty acid or the ester thereof to disperse (as described in e.g., U.S. Pat. Nos. 2,304,939, 2,322,027, etc.), a method in which the coupler is mixed with a low-boiling organic solvent or a water-soluble organic solvent to disperse (as described in, U.S. Pat. Nos. e.g., 3,253,921 and 3,574,627, etc.), a method of dispersing the coupler using a high-boiling solvent in combination with them (as described in, e.g., U.S. Pat. Nos. 2,801,170, 2,801,171, 2,949,360 etc.), and, when the coupler itself has a sufficiently low melting point (for example, less than 75° C), a method of dispersing the coupler alone or in combination with other couplers to be used together, such as a colored coupler or an uncolored coupler (as described in, e.g., German Pat. No. 1,143,707, etc.), can be used. In the above methods suitable examples of low boiling solvents are methyl acetate, ethyl acetate, butyl acetate, sec-butyl alcohol and of water-miscible solvents are tetrahydrofuran, cyclohexanone, methylcellosolve, ethyleneglycol, acetone, ethanol, etc.

As the dispersing aid, conventionally used anionic surface active agents (e.g., sodium alkylbenzenesulfonates, sodium dioctylsuccinate, sodium dodecylsulfate, sodium alkylnaphthalenesulfonates, Fischer type couplers, etc.), amphoteric surface active agents (e.g., N-tetradecyl-N,N-dipolyethylene-α-betaine, etc.), and nonionic surface active agents (e.g., sorbitan monolaurate, etc.) can be used.

The emulsion which is used in the present invention is a gelatino-silver halide photographic emulsion containing grains of silver chloride, silver bromide, silver iodide, silver chlorobromide silver iodobromide, silver iodochlorobromide or a mixture thereof.

Hydrophilic colloids which can be used include gelatin, cellulose derivatives, alginates, hydrophilic synthetic polymers (e.g., polyvinyl alcohol, polyvinyl pyrrolidone, polystyrene sulfonic acid, etc.), and the like. Furthermore, a plasticizer for improving the dimensional stability of films and polymer latex such as polymethyl methacrylate, polyethyl acrylate, etc. as described in U.S. Pat. Nos. 2,376,005; 2,739,137; 2,858,457; 3,062,674; 3,411,911; 3,488,708; 3,525,620; 3,635,715; 3,607,290; 3,645,740 can be used.

To the silver halide emulsion used in the present invention can be applied a conventionally employed chemical sensitizing methods (e.g., gold sensitization as described in U.S. Pat. Nos. 2,399,083, 2,597,856, and 2,597,915; reduction sensitization as described in U.S. Pat. Nos. 2,487,850 and 2,521,925; sulfur sensitization as described in U.S. Pat. Nos. 1,623,499 and 2,410,689; a sensitizing method using different metal ions described in U.S. Pat. Nos. 2,448,060; 2,566,245 and 2,566,263 or a combination thereof).

In addition, spectrally sensitizing methods conventionally used for color light-sensitive materials can also be employed, for example, as described in U.S. Pat. Nos. 2,493,748, 2,519,001, 2,977,229, 3,480,434, 3,672,897, 3,703,377, 2,688,545, 2,912,329, 3,397,060, 3,615,635, 3,628,964, 3,511,664, 3,522,052, 3,527,641, 3,615,613, 3,615,632, 3,617,295, 3,635,721, 3,694,217, etc.

Furthermore, conventional addenda such as a stabilizer (e.g., 4-hydroxy-1,3,3a,7-tetrazaindene derivative, etc.), and an anti-fogging agent (e.g., mercapto compound, benzotriazole derivative, etc.), as described in U.S. Pat. Nos. 1,758,576, 2,110,178, 2,131,038, 2,173,628, 2,697,040, 2,304,962, 2,324,123, 2,394,198, 2,444,605-8, 2,566,245, 2,694,716, 2,697,099 2,708,162, 2,728,633-5, 2,476,536, 2,824,001, 2,843,491, 2,886,437, 3,052,544, 3,137,577, 3,220,839, 3,226,231, 3,236,652, 3,251,691, 3,252,799, 3,287,135, 3,326,681, 3,420,668, 3,622,339, etc., can be employed. In addition a coating aid, for example, as described in U.S. Pat. Nos. 2,271,623, 2,240,472, 2,288,226, 2,739,891, 3,068,101, 3,158,484, 3,201,253, 3,210,191, 3,294,540, 3,415,649, 3,441,413, 3,442,654, 3,475,174, 3,545,974, etc., a hardening agent, for example, as described in U.S. Pat. Nos. 3,288,775, 2,732,303, 3,635,718, 3,232,763, 2,732,316, 2,586,168, 3,017,280, 2,983,611, 2,725,294, 2,725,295, 3,100,704, 3,091,537, 3,321,313, etc., a wetting agent, a sensitizing agent (e.g., an onium derivative such as a quaternary ammonium salt as described in U.S. Pat. Nos. 2,271,623; 2,288,266 and 2,334,864) and a polyalkylene oxide derivative as described in U.S. Pat. Nos. 2,708,162; 2,531,832; 2,533,990; 3,210,191 and 3,158,484 can be suitably used.

Also, dyes for anti-irradiation and, as a constituent for the stratum of the color light-sensitive material of the present invention, a filter layer, a mordant-dyeing layer or a hydrophobic dye-containing colored layer can be present.

The light-sensitive emulsion used in the present invention can be applied to various supports. Suitable such supports are, e.g., cellulose acetate films, polyethylene terephthalate films, polyethylene films, polypropylene films, glass dry plates, baryta papers, resin-laminated papers, synthetic papers, and the like.

The light-sensitive materials obtained according to the present invention are development-processed using a color developing solution containing as a color developing agent conventionally employed p-phenylenediamine derivatives, p-aminophenol derivatives, or the like. The p-phenylenediamine derivatives which can be used include, e.g., p-amino-N-ethyl-N-β-methanesulfoamidoethyl)-m-toluidine sesquisulfate monohydrate, diethylamine-p-phenylenediamine sesquisulfate, p-amino-N,N-diethyl-m-toluidine hydrochloride, p-amino-N-ethyl-N-β-hydroxyethylaniline sesquisulfate monohydrate, p-amino-N-ethyl-N-β-hydroxyethyl-m-toluidine hydrochloride, p-amino-N-ethyl-N-β-hydroethyl-m-ethoxy-aniline sesquisulfate monohydrate and the like. Developers for color negative light-sensitive materials, color negative, or positive light-sensitive materials for cinema, color paper and instant color light-sensitive materials, known in the art, can be used. For example, a color development-processing step substantially as described in Japanese Pat. Publication No. 35749/70, Japanese Pat. application Nos. 67798/69, (which corresponds with British Pat. No. 1,293,038) 13313/71, (which corresponds with British Pat. No. 1,358,615) 19516/71, (which corresponds with British Pat. No. 1,387,731) and German Pat. OLS No. 2,238,051, and in H. Gordon, The British Journal of Photography, Nov. 15th, 1954, p.558 -; ibid, Sep. 9th, 1955, p.440 -; ibid, Jan. 6th, 1956, p.2 -; S. Horwitz, ibid, Apr. 22th, 1960, p.212 -; E. Gehret, ibid, Mar. 4th, 1960, p.122 -; ibid, May 7th, 1965, p.396 -; and J. Meech, ibid, Apr. 3rd, 1959, p. 182 -.

The present invention will now be illustrated in greater detail by reference to the following examples which, however, do not limit the present invention in any way. They are given to further facilitate an understanding of the manner of the application of the techniques of the present invention.

EXAMPLE 1

A first layer, second layer, third layer and fourth layer were applied in turn to a transparent cellulose triacetate film support as shown in FIG. 4 to thereby obtain Sample A. The composition and process for the preparation of each coating solution were as follows.

FIRST LAYER:

1 kg of a silver bromoiodide emulsion (silver content: 0.6 mol; iodide content: 6 mol percent) was taken up and was spectrally sensitized using $4 \times 10^{-5}$ mol of Sensitizing Dye I and $1 \times 10^{-5}$ mol of Sensitizing Dye II. Separately, 100 g of Coupler A was dissolved in a mixture of 100 cc of tricresyl phosphate and 200 cc of ethyl acetate, and emulsified and dispersed in 1 kg of a 10 percent gelatin solution using 4 g of sodium nonylbenzenesulfonate. 450 grams of the thus obtained Emulsion I was added to the above-described spectrally sensitized emulsion. Further, 0.1 g of 2,4-dichloro-6-hydroxytriazine sodium salt was added thereto, under stirring, as an aqueous solution.

SECOND LAYER:

1 kg of a 10 percent gelatin aqueous solution was prepared. 50 grams of 2,5-di-t-octylhydroquinone was dissolved in 100 cc of tricresyl phosphate and emulsified in 1 kg of a 10 percent gelatin aqueous solution to disperse as in Emulsion I. 250 grams of the resulting emulsion was added to the above-described emulsion and stirred.

THIRD LAYER:

1 kg of the silver bromoiodide emulsion (same as in the first layer) was spectrally sensitized using $2 \times 10^{-4}$ mol of Sensitizing Dye III and $6 \times 10^{-5}$ mol of Sensitizing Dye IV. Separately, 100 g of Coupler B was emulsified and dispersed in the same manner as in Emulsion I to thereby obtain Emulsion II. 600 grams of the resulting [Emlsion] *Emulsion* II was added to the above-described emulsion to obtain a finished emulsion in the same manner as in first layer.

FOURTH LAYER:

0.2 gram of sodium nonylbenzenesulfonate was added to 1 kg of a 10 percent gelatin solution.

Materials used for the preparation of Sample A:

| | |
|---|---|
| Sensitizing Dye I: | Anhydro-5,5'-dichloro-3,3'-disulfopropyl-9-ethylthiacarbocyanine Hydroxide Pyridinium Salt |
| Sensitizing Dye II: | Anhydro-9-ethyl-3,3'-di-(3-sulfopropyl)-4,5,4',5'-di-benzothiacarbocyanine Hydroxide Triethylamine Salt |
| Sensitizing Dye III: | Anhydro-9'-ethyl-5,5'-dichloro-3,3'-disulfopropyloxacarbocyanine Sodium Salt |
| Sensitizing Dye IV: | Anhydro-5,6,5',6'-tetrachloro-1,1'-diethyl-3,3'-disulfopropoxyethoxy-ethylimidazolocarbocyanine Hydroxide Sodium Salt |
| Coupler A: | 1-Hydroxy-N-{γ-2,4-di-t-amylphenoxypropyl}-2-naphthoamide |
| Coupler B: | 1-(2,4,6-Trichloro-phenyl)-3-[3-{α-(2,4-di-t-amylphenoxylacetamido}benzamido]-5-pyrazolone |

The procedures described in Sample A were conducted except for using a mixture of Coupler 2 and Coupler B (2:3 in molar ratio) in the third layer in lieu of Coupler B to thereby obtain Emulsion III. Sample B was obtained in the same manner as Sample A, using Emulsion III in place of Emulsion II.

Samples A and B were stepwise exposed using a green light source followed by uniform exposure using a red light source. Then, they were development-processed at 38° C according to the following steps.

| | |
|---|---|
| 1. Color Development | 3 min. and 15 sec. |
| 2. Bleaching | 6 min. and 30 sec. |
| 3. Washing | 3 min. and 15 sec. |
| 4. Fixing | 6 min. and 30 sec. |
| 5. Washing | 3 min. and 15 sec. |
| 6. Stabilizing | 3 min. and 15 sec. |

The compositions of the processing solutions used in the respective steps were as follows.

| | | |
|---|---|---|
| 1.Color Developer: | | |
| Sodium Nitrilotriacetate | 1.0 | g |
| Sodium Sulfite | 4.0 | g |
| Sodium Carbonate | 30.0 | g |
| Potassium Bromide | 1.4 | g |
| Hydroxylamine Sulfate | 2.4 | g |
| 4-(N-Ethyl-N-β-hydroxyethylamino)-2-methylaniline Sulfate | 4.5 | g |
| Water to make | 1 | liter |
| 2. Bleaching Solution: | | |
| Ammonium Bromide | 160.0 | g |
| Aqueous Ammonia (28%) | 25.0 | ml |
| Sodium Ethylenediaminetetra-acetate Iron Salt | 130 | g |
| Glacial Acetic Acid | 14 | ml |
| Water to make | 1 | liter |
| 3. Fixing Solution: | | |
| Sodium Tetrapolyphosphate | 2.0 | g |
| Sodium Sulfite | 4.0 | g |
| Ammonium Thiosulfate (70%) | 175.0 | ml |
| Sodium Bisulfite | 4.6 | g |
| Water to make | 1 | liter |
| 4. Stabilizing Solution: | | |
| Formalin (40%) | 8.0 | ml |
| Water to make | 1 | liter |

As is stated above, the red light transmission density (Curves 1 and 3) and the green light transmission density (Curves 2 and 4) of the thus developed Samples A and B were measured for comparison. The results of the measurement with Sample A are shown in FIG. 1 and the results with Sample B are shown in FIG. 2. With Sample A, the green light density increases with an increase in the exposure amount of green light, while the red light transmission density is almost constant. Thus, the interlayer (or interimage) effect of the green-sensitive layer to the red-sensitive layer is scarcely observed. On the other hand, with Sample B, although the green light density increases with an increase in the exposure of green light similar to Sample A, the red light transmission density is reduced. Thus, the interlayer effect of the green-sensitive layer to the red-sensitive layer is found to be great. This fact shows that Coupler 2 of the present invention contained in the third layer of Sample B sufficiently functions as a coupler which releases a restrainer in proportion to the degree of development.

EXAMPLE 2

A multi-layered color light-sensitive material C as illustrated in FIG. 3 comprising the layers having the following compositions were prepared in the same manner as described in Example 1.

First Layer: antihalation layer

A gelatin layer containing black colloidal silver (0.45 g/m²).

Second Layer: intermediate layer

A gelatin layer containing an emulsion dispersion of 2,5-di-t-octylhydroquinone ($1.6 \times 10^{-4}$ mol/m²).

Third Layer: 1st red-sensitive emulsion layer comprising;

Silver bromoiodide emulsion (iodide content: 8 mol%) coated in a silver amount of 1.2 g/m².

| | |
|---|---|
| Sensitizing Dye I | (as described in Example 1) $6 \times 10^{-5}$ mol/mol silver |
| Sensitizing Dye II | (as described in Example 1) $1.5 \times 10^{-5}$ mol/mol silver |
| Coupler A | (as described in Example 1) 0.09 mol/mol silver |
| Colored Coupler F | 0.02 mol/mol silver |

Fourth Layer: 2nd red-sensitive emulsion layer comprising;

Silver bromoiodide emulsion (iodide content: 8 mol%) coated in a silver amount of 1.1 g/m²

| | |
|---|---|
| Sensitizing Dye I | $3 \times 10^{-5}$ mol/mol silver |
| Sensitizing Dye II | $1.2 \times 10^{-5}$ mol/mol silver |
| Coupler C | 0.02 mol/mol silver |
| Colored Coupler F | 0.04 mol/mol silver |

Fifth Layer: intermediate layer

A gelatin layer containing a 2,5-di-t-octylhydroquinone ($4.8 \times 10^{-4}$ mol/m²) dispersion.

Sixth Layer: 1st green-sensitive emulsion layer comprising;

Silver bromoiodide emulsion (iodide content: 8 mol%) coated in a silver amount of 1.5 g/m²

| | |
|---|---|
| Sensitizing Dye III (as described in Example 1) | $3 \times 10^{-5}$ mol/mol silver |
| Sensitizing Dye IV (as shown in Example 1) | $1 \times 10^{-5}$ mol/mol silver |

Coupler B (as shown in Example 1) 0.06 mol/mol silver

Seventh Layer: 2nd green-sensitive emulsion layer comprising;

Silver bromoidide emulsion (iodide content: 6 mol percent coated in a silver amount of 1.7 g/m²

| | |
|---|---|
| Sensitizing Dye III | $2.5 \times 10^{-5}$ mol/mol silver |
| Sensitizing Dye IV | $0.8 \times 10^{-5}$ mol/mol silver |
| Coupler B | 0.004 mol/mol silver |
| Colored Coupler D | 0.013 mol/mol silver |

Eighth Layer: yellow filter layer

A gelatin layer containing yellow colloidal silver (1.01 g/m²) and 2 2,5-di-t-octylhydroquinone ($4.4 \times 10^{-4}$ mol/m²) emulsion dispersion Ninth Layer: 1st blue-sensitive emulsion layer comprising;

Silver bromoiodide emulsion (iodide content: 7 mol percent) coated in a silver amount of 1 g/m²

| | |
|---|---|
| Coupler E | 0.25 mol/mol silver |

Tenth Layer: 2nd blue-sensitive emulsion layer comprising;

Silver bromoiodide emulsion (iodide content: 6 mol percent) coated in a silver amount of 1.1 g/m²

| | |
|---|---|
| Coupler E | 0.07 mol/mol silver |

Eleventh Layer: protective layer

A gelatin layer containing polymethyl methacrylate particles (diameter: about 1.5 μ; 25 wt percent to the gelatin)

To each of the above-described layers were added a gelatin-hardening agent (2-hydroxy-4,6-dichloro-S-triazine sodium salt) and a coating aid (surface active agent (sodium dodecyl benzene sulfonate), thickening agent (polystyrene sulfonate) in appropriate amounts.

In the same manner as in Sample C except for using the following couplers in the 6th layer, Sample D having a similar structure was prepared.

| | |
|---|---|
| Coupler B | 0.035 mol/mol silver |
| Coupler 7 | 0.025 mol/mol silver |

Samples C and D were formed into 35 mm-color negative light-sensitive materials and subjected to photographing using a still camera. Then, they were color development-processed according to the steps shown in Example 1 to obtain color negatives.

The color purity, graininess and sharpness of the color negative obtained from Sample D were far better than those of the color negative obtained from Sample C. This is because the coupler of the present invention used in the 6th layer imagewise releases a restrainer upon color development, which serves to improve the sharpness of layers magenta layer and exerts interimage effect on the other layers, as described in Example 1, thus improving the color purity.

Materials used for preparing Sample C:

| | |
|---|---|
| Coupler C: | 1-Hydroxy-4-iodo-N-dodecyl-2-naphthoamide |
| Coupler D: | 1-(2,4,6-Trichlorophenyl)-3-tridecylamido-4-(4-hydroxyphenyl)azo-5-pyrazolone |
| Coupler E: | α-(2,4-Dioxo-5,5'-dimethyloxazolidinyl α-pivaloyl-2-chloro-5-α-(2,4-di-t-amylphenoxy)butyramido acetanilide |
| Coupler F: | 1-Hydroxy-4-[2-(2-hexyldecyloxycarbonyl)-phenylazo]-2-[N(1-naphthyl)]-naphthoamide |

Similar results could be obtained by using a coupler selected from Couplers 1 to 6, 8 to 10 and 13 to 21, alone or in combination in lieu of Coupler 7 in 6th layer of Sample D having the stratum structure as shown in Example 2.

Improvement in color purity, graininess and sharpness was observed by using couplers 13 to 19 in the 3rd or 4th layer together with Coupler A, in the 9th or 10th layer together with Coupler E, or in the 5th layer.

Also, similar results were obtained by replacing Coupler A in the 6th and 7th layers of Sample D by the couplers described in U.S. Pat. Nos. 3,127,269, 3,684,514, U.S. Pat. application Ser. No. 415,864, filed Nov. 13, 1973, and Ser. No. 415,853, filed Nov. 13, 1973 and Ser. No. 445,032, filed Feb. 22, 1974 such as the following couplers.

| | |
|---|---|
| Coupler G: | 1-(2,4,6-Trichlorophenyl)-3-[(3-tridecanoylamino-6-chloro) anilino]-5-pyrazolene |
| Coupler H: | 1-(2,4,6-Trichlorophenyl)-3-[3-α-(3-pentadecylphenoxyacetamido] benzamido-5-pyrazolone |

In addition, similar results were obtained by replacing colored Coupler D in the 7th layer of Sample D by the following couplers.

| | |
|---|---|
| Coupler I: | 1-(2,4,6-Trichlorophenyl)-3-β-tetradecyloxy-carbonyl-6-chloro) anilino-4-(1-naphthylazo)-S-pyrazolone |
| Coupler J: | 1-2,4,6-Trichlorophenyl)-3-β-α-(2,4-di-t-amylphenoxy)acetamido] benzamide-4-[(4-methoxy) phenylazo-5-pyrazolone |
| Coupler K: | 1-(2,4,6-Trichlorophenyl)-3-[(3-tridecanoylamino-6-chloro) anilino]-4-[4-acetamino)-phenylazo]-5-pyrazolone |
| Coupler L: | 1-(2,4,6-Trichlorophenyl)-3-[(5-tridecanoylamino-2-chloro) anilino]-4-[(2-methoxy-5-methyl) phenylazo]-5-pyrazolone |

Also, similar results can be obtained by replacing Coupler E in the 9th and 10th layers of Sample D by the couplers described in U.S. Pat. application Ser. No. 235,937, filed Mar. 20, 1972 and Ser. No. 319,806, filed Dec. 29, 1972, or by the following couplers.

| | |
|---|---|
| Coupler M: | α-(4-Carboxyphenoxy)-α-pivaloyl-2-chloro-5-α-(2,4-di-t-amylphenoxy)butyramido-acetanilide |
| Coupler N: | α-3-(1-Benzyl-2,4-dioxo)hydantoin-α-pivaloyl-2-chloro-5-α-(2,4-di-t-amylphenoxy)-butyramido acetanilide |

A similar "color correcting effect" can be obtained by using the compounds described in U.S. Pat. Nos. 3,043,690; 3,379,529 and the like in place of hydroquinone derivative used in Sample D. These compounds can be used in the combination with the coupler of the present invention or with other couplers to obtain a "color correcting effect," anti-fogging action and a rendering of the color image fast.

EXAMPLE 3

600 g of Emulsion II was added to 1 kg of silver bromoiodide emulsion according to Example 1 and applied to a transparent polyethylene terephthalate film support. Separately, 600 g of an emulsion, obtained by emulsifying and dispersing copolymer 2 in the same manner as in Emulsion II, was added to 1 kg of a silver bromoiodide emulsion and applied likewise. These samples were tested at an ordinary temperature in a dark room using an ultraviolet ray-emitting lamp (fluorescence-examining lamp, FL-3S, made by Tokyo Shibaura Electric Co., Ltd.). No substantial fluorescence was observed with either sample.

The above descriptions relating to the Examples provide an understanding of the method of practicing the present invention and the characteristic aspects thereof.

In the Examples, it is possible to change the structure of the light-sensitive emulsion layers, which are colored substantially the same color, to a one-layered or a three-layered structure or to alter the order of the GL, RL and BL optionally depending on the end-use purpose. The layer, to which the couplers, hydroquinone derivatives and like materials are applied, and the combination thereof with other materials can be changed or modified by those skilled in the art according to the end-use purposes, based on the above description and the objects of the present invention.

The present invention can find application to conventionally known color negative light-sensitive materials, color reversal light-sensitive materials color print materials, color transparent positive light-sensitive materials and color papers and, in addition, the element of the present invention can easily find application to a light-sensitive material of a monochromatic system, a direct positive color light-sensitive material such as a color X-ray light-sensitive material and a micro light-sensitive material, a color light-sensitive material of the diffusion transfer system, and the like.

While the invention has been described in detail and with reference to specific embodiments thereof, it will be apparent to one skilled in the art that various changes and modifications can be made therein without departing from the spirit and scope thereof.

What is claimed is:

1. A color photographic silver halide light-sensitive material which comprises a support having thereon at least two light-sensitive layers, at least one of said layers containing a compound capable of coupling with an oxidation product of a color developing agent and in which a splitable hetero aromatic ring containing a triazole or diazole ring is connected to the carbon atom in the coupling position, through the nitrogen atom in the 1-position of said triazole or diazole ring, *said triazole or diazole ring having an aromatic ring fused thereto.*

2. The color photographic light-sensitive material of claim 1, wherein said compound capable of coupling has the general formula (I)

(I)

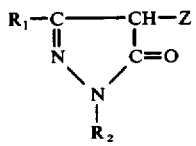

wherein $R_1$ represents an alkyl group, an aryl group, an alkoxy group, *an aryloxy group,* a heterocyclic ring, an amino group, a carbonamide group, or an ureido group; and $R_2$ represents an alkyl group, an aryl group, or a heterocyclic group; the general formula (II)

(II)

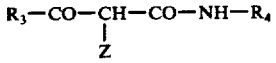

wherein $R_3$ represents an alkyl group of an aryl group; an $R_4$ represents a phenyl group; or the general formula (III)

(III)

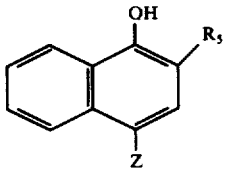

wherein $R_5$ represents a carbamyl group, a sulfamyl group, or an alkoxycarbonyl group; and wherein Z in each of the formulae (I), (II) and (III) represents a triazole or diazole hetero ring residue represented by the following general formula

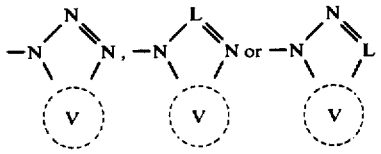

wherein V represents an aromatic ring of the benzene series or a heteroaromatic ring containing at least one nitrogen atom; L represents a methine group; and wherein V can contain substituents selected from the group consisting of an amino group, an acylamino group, a halogen atom, an alkyl group, a nitro group, an alkoxy group, an alkylthio group, *an arylthio group* or an aryl group; wherein two of the moieties of the general formula (I) having the general formula (Ia)

(Ia)

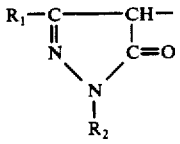

two of the moieties of the general formula (II) having the general formula (IIa)

(IIa)

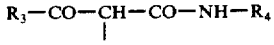

or two of the moieties of the general formula (III) having the general formula (IIIa)

(IIIa)

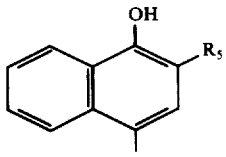

can be combined through a divalent moiety of said Z to form a bis derivative or through a divalent bond or group.

3. The color photographic light-sensitive material of claim 1, wherein said compound capable of coupling contains a nucleus moiety and said splitable heteroaromatic ring, said nucleus moiety being selected from the group consisting of nuclei of 5-pyrazolone couplers, cyanoacetylcumarone couplers, indazolone couplers, acylacetanilide couplers, pivaloylacetanilide couplers, aroylacetanilide couplers, naphthol couplers and phenol couplers.

4. The color photographic light-sensitive material of claim 1, wherein said compound capable of coupling is present in said layer in an amount ranging from about 0.001 to 0.5 moles per mol of silver.

5. The color photographic light-sensitive material of claim 2, wherein Z in each of the formulae (I), (II) and (III) represents a triazole hetero ring residue represented by the following general formula:

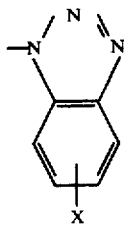

wherein X represents a hydrogen atom, a halogen atom, an alkyl group or the atoms necessary to form a naphthalene ring together with the benzene ring.

6. The color photographic light-sensitive material of claim 2, wherein said compound capable of coupling is 1-(2,4,6-trichlorophenyl)-3-[2-chloro-5-(tetradecanamido)anilino]-4-(5-or 6-acetamido-1-benzotriazolyl)-5-pyrazolone, 1-benzyl-3-[2-chloro-5-(tetradecanamido)anilino]-4-(5- or 6-methyl-1-benzotriazolyl)-5-pyrazolone, 1-benzyl-3-(2-chloro-5-(tetradecanamido)anilino-4-(5- or 6-bromo-1-benzotriazolyl)-5-pyrazolone or 1-(4-acetamidophenyl)-3-[2-methoxy-5-(tetradecyloxycarbonyl)anilino]-4-(5- or 6-bromo-1-benzotriazolyl)-5-pyrazolone.

7. The color photographic light-sensitive material of claim 2, wherein said compound capable of coupling is α-(4-octadecyloxybenzoyl)-α-(5- or 6-bromo-1-benzotriazolyl)-2-methoxyacetanilide, α-pyvaloyl-α-(1-benzotriazolyl)-5-[α-(2,4-di-t-amylphenoxy)butylamido]-2-chloroacetanilide or α-benzoyl-α-(5- or 6-bromo-1-benzotriazolyl)-2-methoxy-5-hexadecyloxycarbonylacetanilide.

8. A color photographic silver halide light-sensitive material which comprises a support having thereon at least two light-sensitive layers, at least one of said layers containing a compound capable of coupling with an oxidation product of a color developing agent and in which a splitable hetero aromatic ring containing a triazole ring is connected to the carbon atom in the coupling position, through the nitrogen atom in the 1-position of said triazole ring, *said triazole or diazole ring having an aromatic ring fused thereto.*

9. The color photographic light-sensitive material of claim 8, wherein said triazole ring residue has the general formula

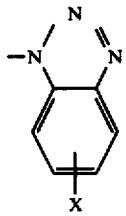

wherein X represents a hydrogen atom, a halogen atom, an alkyl group or the atoms necessary to form a naphthalene ring together with the benzene ring.

10. The color photographic light-sensitive material of claim 8, wherein said compound capable of coupling has the general formula (I)

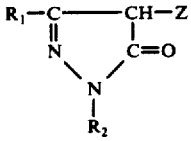

(I)

wherein $R_1$ represents an alkyl group, an aryl group, an alkoxy group, *an aryloxy group,* a heterocyclic ring, an amino group, a carbonamido group, or an ureido group; and $R_2$ represents an alkyl group, an aryl group, or a heterocyclic group; the general formula (II)

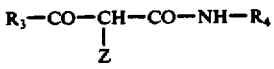

(II)

wherein $R_3$ represents an alkyl group or an aryl group; and $R_4$ represents a phenyl group; or the general formula (III)

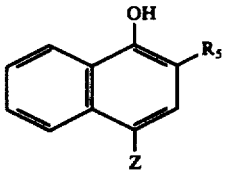

(III)

wherein $R_5$ represents a carbamyl group, a sulfamyl group, or an alkoxycarbonyl group; and wherein Z in each of the formulae (I), (II) and (III) represents a triazole ring residue represented by the following general formula

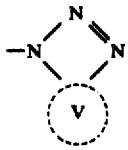

wherein V represents an aromatic ring of the benzene series or a heteroaromatic ring containing at least one nitrogen atom; and wherein V can contain substituents selected from the group consisting of an amino group, an acylamino group, a halogen atom, an alkyl group, a nitro group, an alkoxy group, an alkylthio group, *an arylthio group,* or an aryl group; wherein two of the moieties of the general formula (I) having the general formula (Ia)

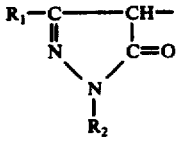

(Ia)

two of the moieties of the general formula (II) having the general formula (IIa)

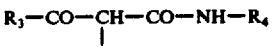

(IIa)

or two of the moieties of the general formula (III) having the general formula (IIIa)

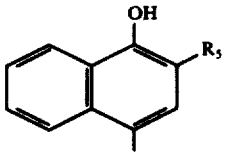

(IIIa)

can be combined through a divalent moiety of said Z to form a bis derivative or through a divalent bond or group.

11. The color photographic light-sensitive material of claim 8, wherein said compound capable of coupling contains a nucleus moiety and said splitable heteroaromatic ring, said nucleus moiety being selected from the group consisting of nuclei of 5-pyrazolone couplers, cyanoacetylcumarone couplers, indazolone couplers, acylacetanilide couplers, pivaloylacetanilide couplers, aroylacetanilide couplers, naphthol couplers and phenol couplers.

*12. The color photographic light-sensitive material of claim 1, wherein said aromatic ring fused is an aromatic ring of the benzene series or a heteroaromatic ring containing at least one nitrogen atom.*

*13. The color photographic light-sensitive material of claim 1, wherein said splitable heteroaromatic ring is represented by the following general formulae*

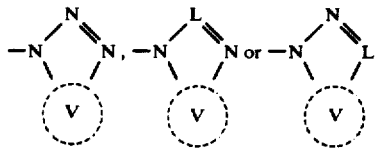

*wherein V represents an aromatic ring of the benzene series or a heteroaromatic ring containing at least one nitrogen atom; L represents a methine group; and wherein V can contain substituents selected from the group consisting of an amino group, an acylamino group, a halogen atom, an alkyl group, a nitro group, an alkoxy group, an alkylthio group, an arylthio group, or an aryl group.*

* * * * *